H. M. MILLER.
EYEGLASSES.
APPLICATION FILED JULY 7, 1917.
1,291,593.
Patented Jan. 14, 1919.
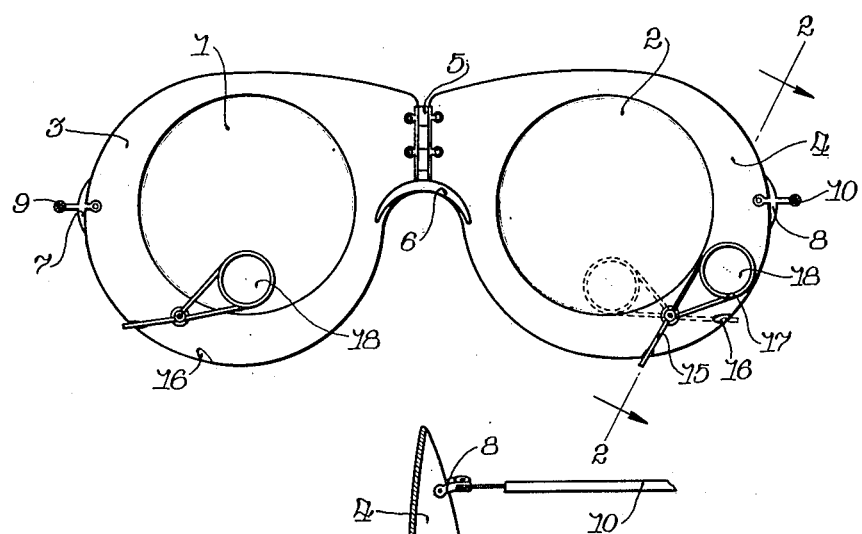
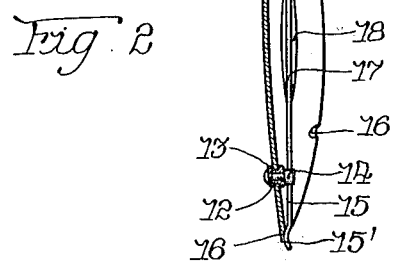
Inventor
Harry M. Miller
By Brown, Hanson & Boettcher
Attorneys

UNITED STATES PATENT OFFICE.

HARRY M. MILLER, OF CHICAGO, ILLINOIS, ASSIGNOR OF ONE-HALF TO CHARLES A. BROWN, HARVEY L. HANSON, AND ARTHUR H. BOETTCHER, COPARTNERS DOING BUSINESS UNDER THE FIRM-NAME OF BROWN, HANSON AND BOETTCHER, OF CHICAGO, ILLINOIS.

EYEGLASSES.

1,291,593.   Specification of Letters Patent.   Patented Jan. 14, 1919.

Application filed July 7, 1917. Serial No. 179,113.

*To all whom it may concern:*

Be it known that I, HARRY M. MILLER, a citizen of the United States, residing at Chicago, in the county of Cook and State of Illinois, have invented a certain new and useful Improvement in Eyeglasses, of which the following is a full, clear, concise, and exact description, reference being had to the accompanying drawings, forming a part of this specification.

My invention relates to eye glasses, or more generally to recreation glasses for protection of the eyes from dust, wind, and bright sunlight in motoring, golfing, yachting, on the beach, or the like.

My invention aims to apply to such glasses supplementary lenses which can be swung into the field of vision whenever it is desired to read or examine objects closely as for instance to consult road maps, mark up golf scores or examine charts, or printed matter without the bothersome necessity of replacing the glasses with others having the correct focal characteristics, and which, when swung out of the field of vision, will be entirely obscured from external view and will not render the glasses unsightly or cumbersome in appearance. To make the device commercially practicable it is of the utmost importance that the supplementary lenses be inconspicuous in both positions.

The supplementary lenses or "scales," as they are commonly termed in the art, may have special focal powers as required to correct the vision of the individual wearer or may have purely magnifying powers for counteracting the obscurity of the vision resulting from the amber tint of the main lenses.

In the drawing:

Figure 1 is an inside elevational view of the glass; and

Fig. 2 is an enlarged sectional view thereof taken on the line 2—2 of Fig. 1 and looking in the direction indicated by the arrows.

The main lenses 1 and 2 are mounted in individual frames 3 and 4 of celluloid, zylonite or similar material which are tinted to an amber tone of the desired translucency. The main lenses 1 and 2 are also preferably tinted and may have focal curvature or not as desired. The frames 3 and 4 are hinged together by the hinge joint 5, which permits the frames 3 and 4 to be better adjusted to the features of the wearer and to be more easily put on and taken off. The central pin of the hinge 5 carries at its lower end the nose guard 6, which may assume any angular position relative to the frames 3 and 4 to accommodate the guard to the nose of the wearer, and to permit of freedom in putting the glasses on and taking them off. End pieces 7 and 8 are secured upon the outer periphery of the frames 3 and 4 and have the bows 9 and 10 pivoted thereto. It is not essential that this type of mounting be employed as my invention is also adaptable to other types of mounting, although the above is the preferred form.

In the outside lower portion of each of the frames 3 and 4 a pivotal mounting is provided for each of the scales. An eyelet 12 is punched through the body of the frame and turned over on each side. A pin 13 is journaled in the eyelet 12 and is headed on the outer side of the frame, to retain the pin in the eyelet. On the inner side of the frame the pin 13 carries a hub 14, integrally formed therewith. A diametrical hole through the hub 14 supports a wire 15 which is extended below the hub down adjacent the lower edge of the main frame. A curved hump 15' is formed in this extension of the wire, to engage with the notches 16 formed on the lower inner edge of the main frame to retain the scale in its operative or inoperative position. The hump 15' also provides a member for engagement by a finger of the wearer when he is desirous of shifting the scale.

The wire 15 is extended up above the hub 14 and is made to encircle or otherwise connect with the small frame 17 of the scale 18. The scale in its operative position is arranged to be in vertical alinement with the center of the main lens and adjacent the lower edge of the main lens. Due to the proximity of the scale to the eye it can be very small and still subtend a fairly large visual angle, sufficient for reading purposes.

In its inoperative position the scale lies completely behind the translucent or opaque main frame 4. This portion of the frame 4 is widened slightly to conceal the scale 18. It is to be understood that the main frames 3 and 4 need not be of such a deep tint as to materially limit the vision through them as a comparatively light tint will effectively conceal the scales to a casual observer.

The friction of the pivotal mounting 13 and the engagement of the lower extension of the wire 15 against the inner edge of the main frame 4, retains the scale or auxiliary lens 18 in its desired position even against jars or shaking.

I do not intend to be limited to the precise details of construction shown or described, as the invention may be embodied in different forms and may be constructed with additional refinements without departing from the invention set out in the appended claims.

I claim:

1. In a pair of goggles, a relatively flat and wide semi-opaque main frame, lenses mounted therein, an auxiliary lens of relatively small diameter, a wire lens holder pivotally mounted on the rear face of the main frame, the auxiliary lens adapted to be swung into focal position and to a position out of sight behind the main frame, said wire lens holder having a hooked handle extending out around the outer edge of the main frame, retaining notches in the edge of the main frame adapted to receive the said hooked end and retain the auxiliary lens in its limiting positions.

2. In a pair of goggles having a main frame, an auxiliary lens pivotally mounted on the main frame for swinging movement into focal position and to a hidden position behind the main frame, a spring wire handle connected to the auxiliary lens having a hooked outer end embracing the outer rim of the main frame, and limiting notches in the outer edge of the main frame into which said handle is adapted to spring to hold the auxiliary lens at its two limiting positions.

In witness whereof, I hereunto subscribe my name this 28th day of June, A. D. 1917.

HARRY M. MILLER.